United States Patent [19]
Strickland

[11] 3,824,844
[45] July 23, 1974

[54] SOIL MOISTURE MONITOR
[75] Inventor: Robert E. Strickland, Los Angeles, Calif.
[73] Assignee: Water Rite Inc., Los Angeles, Calif.
[22] Filed: May 11, 1973
[21] Appl. No.: 359,617

[52] U.S. Cl. .................................................. 73/73
[51] Int. Cl. ...................... G01n 19/10, G01n 33/24
[58] Field of Search .................... 73/73; 116/114 AS

[56] References Cited
UNITED STATES PATENTS
3,019,638  2/1962  Klein ......................................... 73/73
3,414,415  12/1968  Broad ................................. 73/73 X Primary Examiner—James J. Gill
Attorney, Agent, or Firm—Christie, Parker & Hale

[57] ABSTRACT

An inexpensive device is provided for sensing the moisture content of soil, particularly around house plants. The device has a dark colored background with a thin, permeable hydrophilic film in front of it. The film is protected by a transparent plastic layer in front and the assembly is heat sealed together. A hole is pierced through the protective layer for giving the permeable film access to soil moisture. The permeable film is preferably a sheet of light colored, single ply facial or toilet tissue which has high reflectivity and low transmission of light when dry but which becomes quite translucent when wet. The extent of dark colored background exposed by the wet film indicates soil moisture content.

9 Claims, 3 Drawing Figures

PATENTED JUL 23 1974          3,824,844

SOIL MOISTURE MONITOR

BACKGROUND

In order for house plants which have a limited soil volume to remain healthy it is necessary to maintain a suitable soil moisture level. Either underwatering or overwatering can be a hazard. Usually of most significance in terms of maintaining a living plant is the failure to water, with consequent drying and dying of the roots. It is often difficult to tell when the soil around a house plant has become too dry since the surface appearance may not change and it is necessary to probe the soil to sense the moisture content. Probing disturbs the roots. It is therefore desirable to have some means permanently positioned for sensing soil moisture content simply by color change.

A variety of techniques have been proposed for sensing moisture. Many of these employ cobalt chloride which, as is well known, undergoes a color change depending on the quantity of water associated with the crystals. Other techniques have employed deliquescent materials to pick up air moisture and cause a reaction with litmus paper or other pH indicators or with dyes that are water sensitive. Such arrangements are quite suitable for sensing atmospheric humidity where substantial quantities of liquid water are not ordinarily present.

One approach for measuring soil moisture content is disclosed in U.S. Pat. No. 3,019,638. The disclosed device includes a sheet of blotting paper or the like which is light in color when dry but which becomes dark when wetted. The resultant change of color intensity signals moisture content. Such blotting paper is relatively thick and preformed parts are employed in making the assembly. Preferably the soil moisture monitor can be made simply from sheet materials without precutting for minimum cost.

BRIEF SUMMARY OF THE INVENTION

There is therefore provided in practice of this invention according to a presently preferred embodiment, a soil moisture monitor having a dark colored background layer and a thin, light color hydrophilic permeable film in front of the background. The film has relatively low light transmission when dry and relatively high light transmission when wet so that the dark background is masked when the film is dry and disclosed when it is wet. Preferably a transparent protective layer is provided over the film with means for exposing an edge portion of the film to soil moisture.

DRAWINGS

These and other features and advantages of the present invention will be appreciated as the same becomes better understood by reference to the following detailed description of a presently preferred embodiment when considered in connection with the accompanying drawings wherein.

DESCRIPTION

Figure 1:
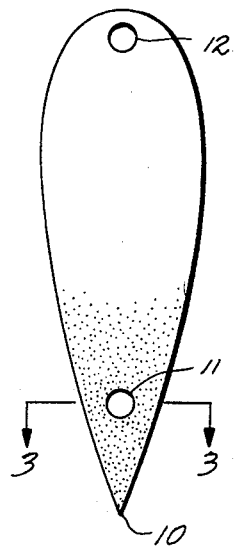
FIG. 1 illustrates a dry moisture monitor constructed according to principles of this invention.

FIG. 1 illustrates in face view a soil moisture monitor constructed according to principles of this invention. As illustrated in this arrangement the monitor is a thin, flat sheet like article in the general shape of a leaf so that when it is inserted into the soil adjacent a house plant it is relatively unobtrusive. One end 10 of the monitor is pointed so that it can be readily pushed into the soil around a house plant. Near the end a hole 11 is punched to permit access to the soil moisture, as will be apparent hereinafter. Another hole 12 is punched through the monitor near its upper end.

Figure 2:
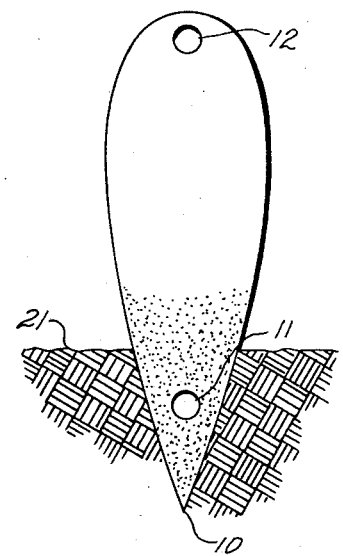
FIG. 2 is a fragmentary transverse cross section of the monitor of FIG. 1.

FIG. 2 illustrates in transverse cross section the laminated moisture monitor. The back face of the monitor is formed of a layer of rigid transparent vinyl plastic 13 having a thickness of about 0.015 inch. Adjacent the backing layer 13 is a dark colored layer 14 of calendared soft vinyl plastic (such as polyvinyl butyral) about 0.020 inch thick. The soft vinyl interlayer 14 contains a dark green dye or pigment which provides a strong color and renders the layer substantially opaque.

Overlying the soft vinyl layer 14 is a thin layer 16 of single ply paper facial or toilet tissue. The film of tissue has a light color such as pale yellow or white which contrasts with the dark color of the underlying vinyl layer. It is found that commercially available single ply toilet and facial tissues from a broad variety of manufacturers are closely comparable in density and permeability. Such single ply tissue paper is hydrophilic and permeable so that when in contact with water some of the water is drawn into the tissue for a considerable distance by its inherent capillarity. It is a characteristic of such tissues that when they are dry they have relatively low light transmission and high reflectivity. On the other hand when the tissue is wet by absorbed water, the light transmission greatly increases and the reflectivity falls off sharply.

Overlying the tissue film 16 is an uppermost layer of transparent rigid plastic 17 about 0.015 mil thick. The hole 11 is punched through this lamination of four layers so that an edge portion 18 of the tissue film is exposed. The hole 11 is punched with a cold tool so that no heat sealing occurs around the edges of the hole. The transparent plastic layers 13 and 17 are water resistant and provide mechanical protection for the inner layers.

Such a moisture monitor is readily made by laying the four layers of sheet materials one over the other with the only care required being to avoid wrinkles in the thin tissue paper film and keep it in contact with the colored backing. A conventional sealing die is then brought down over the stack to cut the moisture monitor to shape and heat seal the edges. Such a heat sealing die has a sharpened metal rim heated to a sufficient temperature to effect heat sealing. Within the rim and having a small clearance from the cutting or sealing edge is a rubber pressure pad that engages the stack of layers in advance of the cutting edge as the die is brought down. The pressure pad holds the layers in close engagement during subsequent cutting and heat sealing. The heated sealing edge then engages the stack of sheets and cuts most of the way therethrough. The sealing pressure causes a slight peripheral bulge 19 in the article in the small clearance between the pressure pad and heated sealing edge. The thin flash around the cut part is readily torn to remove the moisture sensor from the sheet raw material.

The heated sealing edge melts at least a portion of the soft vinyl layer 14 which thereby forms a strong adhesive bond to the underlying layer 13. The vinyl interlayer 14 has a lower melting point than either outside layer and therefore most melting of the plastic is in this interlayer. In addition, the soft molten vinyl is squeezed through the porous tissue film 16 and forms a good adhesive bond with the uppermost protective layer 17. The molten vinyl thus secures the edges of the lamination together and provides a substantial edge seal by reason of its flow through the porous tissue. It is not of importance that the edges of the monitor be completely sealed against moisture intrusion but it is important that sufficient vinyl pass through the thin porous film to form a structural bond to the overlying protective layer. The resultant integral bond of the four layers of the moisture monitor is apparently the simplest and cheapest production technique available. Since the tissue is thin and permeable an integral bond can be obtained without precutting the tissue to size.

Figure 3:
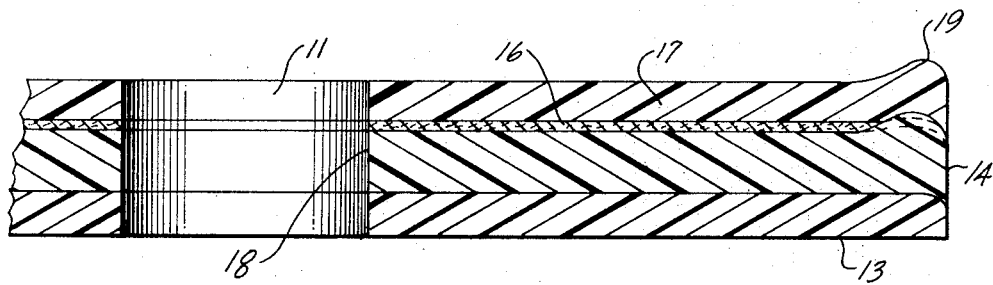
FIG. 3 illustrates the monitor inserted in moist soil.

When the soil moisture monitor is used the pointed end 10 is pressed into the soil 21 surrounding a house plant or the like and it is simply left in position at all times. Moisture in the soil contacts the edge of the tissue film in the monitor by way of the hole 11 and soaks into the tissue as indicated by the stippled area in FIG. 3. When the tissue is dry it appears white or light colored with only a small amount of the green backing of the vinyl layer showing through. The dry tissue has relatively low light transmission and its light color enhances its reflectivity to give a greater appearance of whiteness. When the tissue becomes wet its light transmission increases dramatically and the reflectivity falls off sharply. These combine to disclose the dark green backing behind the tissue and the sharp color contrast is readily noted. Thus, when the house plant is properly watered the moisture monitor appears as a healthy green, however, if the soil becomes unduly dry, the tissue dries out and the monitor appears nearly white. The best sensitivity is obtained when the tissue clings to the colored background. Any substantial spacing between the tissue and the background reduces light transmission and the intensity of dark color that shows through when the tissue is wet.

It will be noted that the hole 11 is pierced through the moisture monitor at a point above the tip. This helps prevent the soil from tightly clogging the hole when the monitor is inserted into the soil and assures that soil moisture can reach the tissue layer. The hole 12 at the upper end of the monitor apparently speeds capillary action and enhances water penetration towards the top.

The flat laminated construction described above is preferred because of the protection afforded by the transparent sheath and the ease of fabrication. The effect of varying light transmission due to wetting of the permeable film can be obtained in other arrangements. Thus, for example, a single ply tissue adhesively bonded to a dark colored stick will give a suitable indication of soil moisture content, but the lack of mechanical protection of the film can lead to damage. Such protection can be partly provided by simply enclosing the sensor in a transparent tubular sheath. Another construction may have a cylindrical rod of dark colored material coated with a light colored hydrophilic permeable layer. Allulosic layers are suitable as may be some plastics that are readily wettable by water. The rod may be wrapped with a transparent protective sheath if desired.

Although limited embodiments of soil moisture monitor constructed according to principles of this invention has been described and illustrated herein, many modifications and variations will be apparent to one skilled in the art. Thus, for example, although dark green is considered a highly desirable color for the backing since it suggests verdancy, other colors that contrast with the tissue in front of it may be used. If desired a dark tissue in front of a light background can be used if the dark tissue develops a substantial degree of transparency when wet so that the contrasting color of the background shows through. Any combinations of contrasting colors of the permeable layer and the background will suffice to indicate proper watering. The light tissue and dark background is greatly preferred since the color contrast is most pronounced.

It will also be apparent that the color of the backing can be incorporated in the outermost layer or could be printed on the layers rather than incorporated in the soft vinyl. If desired the edges of the assembly could be secured by means of cements, however, the desired structure appears to give the most economical manufacturing technique. Many other modifications and variations will be apparent to one skilled in the art and it is therefore to be understood that within the scope of the appended claims the invention may be practiced otherwise than as specifically described.

What is claimed is:

1. A soil moisture monitor comprising:
   a dark colored background layer;
   a light colored hydrophilic permeable film in front of the background, said film having relatively low light transmission when dry and relatively high light transmission when wet;
   means for exposing a portion of the film to moisture; and
   a transparent protective cover over the permeable film.

2. A moisture monitor as defined in claim 1 wherein the dark colored background layer comprises:
   a substantially rigid water resistant protective layer on the outside; and
   a soft, lower melting interlayer between the permeable film and the protective layer.

3. A moisture monitor as defined in claim 2 wherein the permeable film is sufficiently thin that plastic from the interlayer can flow therethrough when molten and contact the protective cover.

4. A moisture monitor as defined in claim 3 wherein the permeable film comprises a paper tissue.

5. A moisture monitor as defined in claim 4 wherein the background layer and protective layer are sealed together around the edges through the tissue; and wherein the means for exposing an edge portion of the film comprises a hole through the moisture monitor displaced from an end thereof.

6. A soil moisture monitor comprising:
   a water resistant protective sheath having a transparent portion and a dark colored background behind the transparent portion;
   a hydrophilic permeable film between the transparent portion and the background, said film having relatively high light reflectivity and relatively low light transparency when dry and relatively low light reflectivity and relatively high light transparency when wet; and an aperture through the sheath for exposing a portion of said film.

7. A laminated soil moisture monitor as defined in claim 6 wherein the permeable film comprises a single ply paper tissue.

8. A laminated soil moisture monitor as defined in claim 6 wherein said sheath comprises a pair of outer layers of transparent, relatively rigid plastic and a relatively softer, lower melting point plastic interlayer therebetween having its edge portions heat sealed to the pair of outer layers, including at least a portion sealed through the tissue.

9. A laminated soil moisture monitor as defined in claim 6 wherein the sheath comprises a pair of outer layers of substantially rigid plastic and said film is sufficiently thin and premeable for passing a sealing agent therethrough between the faces of the sheath around the periphery of the monitor.

* * * * *